Aug. 11, 1931.  J. D. ISAACKS  1,818,258
GAUGE STABILIZER
Filed June 18, 1928

INVENTOR.
James D. Isaacks
BY Jesse R. Stone
ATTORNEY

Patented Aug. 11, 1931

1,818,258

UNITED STATES PATENT OFFICE

JAMES D. ISAACKS, OF HOUSTON, TEXAS

GAUGE STABILIZER

Application filed June 18, 1928. Serial No. 286,138.

My invention relates to means for stabilizing the action of the indicating needle in fluid pressure gauges.

It is for use on pressure gauges on lines in which fluids are conducted under pressure as in air compressors, pumps, pressure stills and the like, where the fluid is agitated by means of a pump or otherwise, to prevent the indicating needle upon the gauge from constantly varying under the agitation of the fluid. In such cases the needle may have a vibration of several degrees and when an accurate reading is to be obtained it is almost impossible to get such a reading from the gauge, while the pump is in operation.

It is an object of my invention to provide a stabilizer in the fluid line, preferably at a point closely adjacent the gauge, which will have a dampening effect upon the fluid flowing through the line so that the fluctuations in pressure due to the pump or other agitating means will be substantially eliminated.

It is a further object of the invention to provide a stabilizer of the character stated which will be small and economical to construct and adapted to be easily coupled into the fluid line.

It is desired to provide means whereby the fluid flowing in the line will be submitted to the action of friction through restricted orifices and will also be allowed to expand after passing through the orifices, thus preventing the transmission of shock directly upon the gauge.

Referring to the drawings herewith wherein certain specific embodiments of the invention are disclosed, Fig. 1 is a central longitudinal section through a device embodying my invention.

Figure 3:
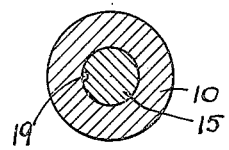
Fig. 3 is a similar section taken on the plane 3—3 of Fig. 1.

In carrying out my invention I contemplate a device which may be connected within the pipe leading from the flow line to the gauge. In a preferred embodiment of my invention I employ a short tube 10, each end of which is threaded at 11 to receive a coupling 12 by means of which it may be connected in a branch pipe, the line 13 leading to the gauge 14.

The tube 10 is of a substantial construction, having comparatively strong walls, the interior passage therethrough being of uniform diameter and adapted to receive a core 15. This core is provided on its outer periphery with a plurality of circumferential grooves or recesses 16 cut somewhat deeply in the core to provide expansion chambers at spaced intervals along the core and between the same and the inner wall of the tube 10.

Figure 1:
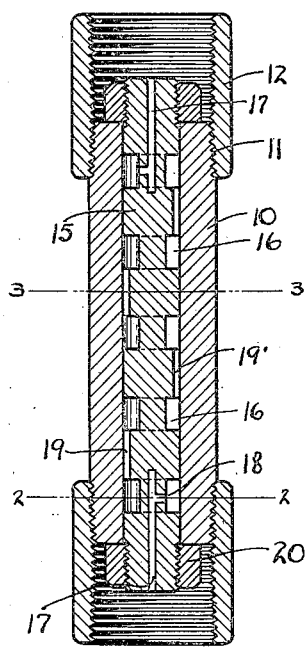
Figure 2:
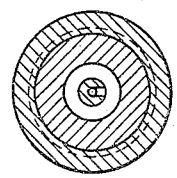
Fig. 2 is a transverse section on the plane 2—2 of Fig. 1.

The ends of the core have an axial passage 17 leading from the end inwardly to the point adjacent the first chamber 16 and a lateral opening 18 connects the passage 17 with said chamber. Each chamber is connected with the next inner adjacent chamber by a small duct or passage 19 which is made by forming a longitudinal groove in the outer surface of the core leading from one chamber to the next and as will be seen from Fig. 1, the adjacent passages 19 are 180 degrees apart, thus providing a passage or orifice on one side leading to a chamber 16 and a second passage or orifice 19 on the opposite side leading from the first chamber to the next adjacent chamber.

The core is held in position within the tube by extending the ends of the core beyond the ends of the tube and threading the same to receive nuts 20 at each end thereof.

In operation the pressure fluid, whether gas or liquid, will pass from the flow line through the pipe 13 and the stabilizer to the gauge, and in its passage through the stabilizer it will first pass through a constricted channel or orifice 17 to the chambers 16 in sections and as the fluid enters one of the chambers, it is checked in its flow and in case of gas is expanded somewhat. It then passes through a second orifice on the opposite side of the core to a second expansion chamber. By repeating the expansion and contraction of the gas in passing through this stabilizer, its flow is checked so that no material fluctuations will appear upon the gauge. In the use of the stabilizer with liquids, the direct flow of the liquid through the stabilizer is checked to such an extent that ordinary fluctuations in the liquid will be substantially removed.

Figure 5:
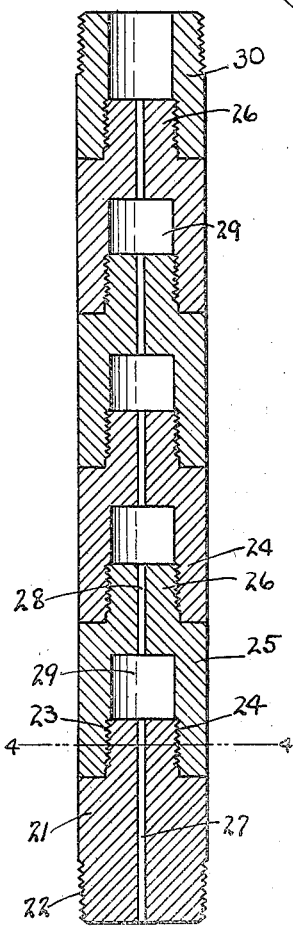
Fig. 5 is a central longitudinal section through somewhat different embodiment of the invention.
Figure 6:
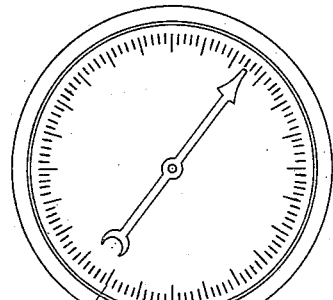
Fig. 6 is a front elevational view of a gauge equipped with my invention. Like numerals of reference are employed to designate like parts in all the views.
Figure 4:
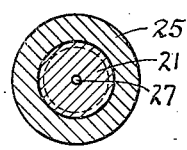
Fig. 4 is a transverse section on the plane 4—4 of Fig. 5.

In Fig. 5 I have shown another embodiment of the invention wherein fluid is passed through a constricted channel or orifice into an expansion chamber and this operation is repeated as many times as is necessary to check the fluctuations in the fluid. The operation is very similar to that in the embodiment just described. The construction, however, includes an end plug 21 which is threaded at 22 for engagement with a coupling and has its opposite end reduced in diameter and threaded at 23 to fit within the box 24 at the lower end of the next section 25. I provide a plurality of sections 25 each of which has box 24 at one end and a pin 26 at the other end, the pin 26 being reduced to fit within the next adjacent box 24. The plug 21 has a central constricted channel 27 thereto and each of the sections also has an axial orifice 28 therethrough. The interior of each of the sections is recessed so as to provide therein a chamber 29. At the upper end of the stabilizer the pin member 26 is screwed within the lower end of a coupling member 30 which may connect the device with an adjacent coupling in the line.

The advantages of this device are that it may be easily and economically constructed and it may be connected adjacent the gauge with very little difficulty. It may be formed with as many sections as are necessary to eliminate the fluctuations in the fluid. In use it has been found that it practically eliminates the vibrations of the needle upon the indicator.

Having thus described my invention, what I claim as new is:

1. A stabilizer for fluid pressure gauges comprising a tubular body, a core fitting closely therein, said core having a plurality of spaced recesses in its outer surface forming chambers within said tubular body, there being constricted passages connecting said chambers, and constricted passages from the endmost of said chambers to the outside in the manner described.

2. A stabilizer for fluid gauges comprising a tubular body, a core fitting closely therein, said core having a plurality of spaced recesses in its outer surface forming chambers within said tubular body, there being constricted passages formed in the outer surface of said core, and constricted passages from the endmost of said chambers to the outside in the manner described.

3. A stabilizer for fluid pressure gauges comprising a tubular body, a core fitting closely therein, said core having a plurality of spaced recesses in its outer surface forming chambers within said tubular body, there being constricted passages formed in the outer surface of said core, said passages being formed alternately upon opposite sides of said core to provide a tortuous fluid channel, and constricted passages from the endmost of said chambers to the outside in the manner described.

In testimony whereof I hereunto affix my signature this 8th day of June, A. D. 1928.

JAMES D. ISAACKS.